United States Patent
Ohmi

[11] 3,974,741
[45] Aug. 17, 1976

[54] BRAKE BOOSTER

[75] Inventor: Atsushi Ohmi, Anjyo, Japan

[73] Assignee: Aisin Seiki Kabushiki Kaisha, Japan

[22] Filed: Apr. 18, 1975

[21] Appl. No.: 569,380

[30] Foreign Application Priority Data
Apr. 19, 1974  Japan.............................. 49-44813

[52] U.S. Cl. ............................. 91/376 R; 92/98 R
[51] Int. Cl.² .......................................... F15B 9/10
[58] Field of Search .......... 91/369 A, 369 B, 369 R, 91/376 R

[56] References Cited
UNITED STATES PATENTS

| | | | |
|---|---|---|---|
| 3,199,298 | 8/1965 | Brown............................. | 91/376 R |
| 3,316,816 | 5/1967 | Yardley........................... | 91/376 R |
| 3,387,455 | 6/1968 | Eggstein.......................... | 91/376 R |

*Primary Examiner*—Paul E. Maslousky
*Attorney, Agent, or Firm*—Holman & Stern

[57] ABSTRACT

A brake booster unit has a housing composed of a front and a rear shell element detachably coupled with each other; a resilient diaphragm is mounted in the interior space of the housing for mechanical separation thereof into a vacuum chamber and a atmospheric pressure chamber; a sleeve member and a motion-transmitting rod concentrically arranged thereto and connected with a brake pedal are partially introduced sealingly and movably into the interior of the atmospheric chamber; first valve means is formed between the rod and the sleeve for "on-off" control of fluid communication between the atmospheric pressure chamber and ambient atmospheric pressure; second valve means includes a beaded inner periphery of the diaphragm and acting as a valve seat; a valving portion to mate with the diaphragm is formed on the sleeve and has a configuration preventing unintentional radial displacement of the beaded periphery while the booster unit is urged toward its operating position; the second valve means is kept at its "closed" position when interruption of fluid communication between the both chambers is required.

5 Claims, 1 Drawing Figure

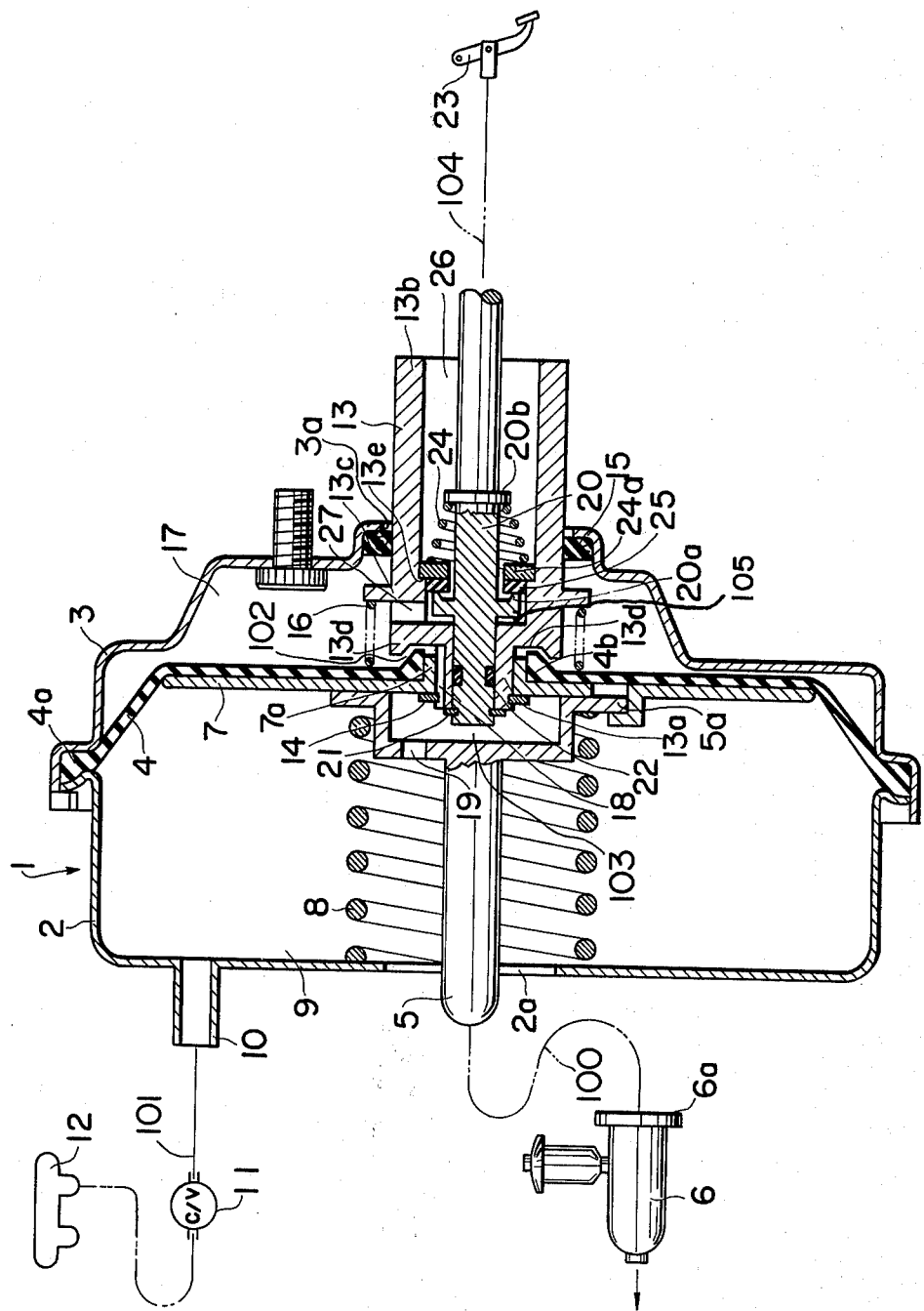

BRAKE BOOSTER

FIELD OF THE INVENTION

This invention relates to improvements in and relating to brake booster units, especially adapted for use in automotive brake systems.

BACKGROUND OF THE INVENTION

A most representative design of such brake booster unit represents a housing comprising a front and a rear shell element mechanically coupled with each other and holding firmly a pneumatically operated resilient membrane by squeezing therebetween the outer periphery of the latter. By the provision of this membrane, the interior space of the housing is divided into two chambers, one being the vacuum chamber fluidically connected with a suction manifold of a drive internal combustion engine, the other being the atmospheric pressure chamber kept in fluid communication with ambient atmosphere. The root or inner periphery of the said diaphragm is mounted, in this case, in a recess formed on the rod portion of a power piston. In such a conventional arrangement, however, when the operative air pressure differential between the chambers is applied to the diaphragm it is liable to disengage radially from position. In addition, the related parts of the unit, with the attached portion of the diaphragm, must be fabricated and tightly assembled together to a high precision for tight fitting of the diaphragm for establishing enough airtight attachment of the latter in position.

SUMMARY OF THE INVENTION

It is therefore an object of the present invention to provide an improved brake booster unit devoid of the aforementioned conventional drawbacks and representing a simpler design and having economical advantages.

This and further objects, features and advantages of the present invention will become more apparent from the following detailed description of the invention to be taken with reference to the accompanying drawing.

BRIEF DESCRIPTION OF THE DRAWING

The sole drawing is a sectional drawing of a preferred embodiment of the present invention wherein, several parts are shown schematically and in elevation.

DESCRIPTION OF A PREFERRED EMBODIMENT

In the following, a preferred embodiment of the present invention will be described in detail with reference to the accompanying drawing.

In FIG. 1, numeral 1 represents a housing having substantially a cylindrical configuration and comprising a front half shell 2 and a rear half shell 3 rigidly coupled together at their mutually confronting outer flange portions by conventional fixing means (not shown) such as bolting, fusing, welding or the like. A flexible diaphragm 4 is fixedly mounted in the housing 1 by its thickened peripheral portion 4a sandwiched between said mutually and fixedly coupled outer flange portions of the shells 2 and 3.

A push rod 5 is arranged to reciprocate axially along its central axis and concentrically with a central bore 2a of the front shell 2, said rod normally extending a certain length through said bore from inside to outside of the housing as shown. One end of the push rod 5 is operatively connected with a conventional master cylinder 6, as indicated by a chain-dotted line 100, while the opposite end enlarged and recessed is fixedly attached with a movable wall 7 by means of conventional fixing means; preferably bolts and nuts, although not shown for simplification of the drawing.

Numeral 8 represents a return coil spring which is mounted under compression between the inside wall surface of front shell 2 and, end 5a of the rod 5 for urging the push rod 5 towards right in the drawing; i.e., for urging mechanically the diaphragm 4 towards rear shell 3 through the intermediary of movable wall 7. Numeral 9 represents a vacuum chamber which is defined by front shell 2, diaphragm 4, an enlarged attaching end 6a of master cylinder 6 and push rod 5, and which kept in fluid communication with an intake manifold 12, shown schematically, of a vehicle prime mover, preferably an automotive internal combustion engine, not shown, through a duct or socket 10 provided on the front shell 2, piping 101 including a check valve 11 and line 101.

Numeral 13 represents a sleeve formed with a reduced diameter front end portion 13a which is relatively slidable through the axial bore of an axially and rearwardly projecting ring flange 7a formed on the movable wall 7. The reduced end portion 13a is provided with a stop clip ring 14 adapted for engagement with movable wall member 7.

Main body portion 13b of sleeve 13 is relatively slidably mounted through a sealing ring 15 carried by shell 3 and positioned in close proximity of a central bore opening 3a of the rear shell 3.

A relatively weak or light spring 16 is inserted under compression between the diaphragm 4 and an intermediate ring flange 13c on sleeve 13 for urging the diaphragm 4 into contact with movable wall 7 and to move sleeve 13 towards right.

An atmospheric pressure chamber 17 occupies part of the interior space of the housing 1 and is defined jointly by rear shell 3, diaphragm 4, part of sleeve 13 and sealing ring 15.

In the shown position of the booster unit, atmospheric pressure chamber 17 is normally in fluid communication with the vacuum chamber 9 through a closable ring passage 102 formed between the thickened bead-like ring projection 4b formed on the inner periphery edge of diaphragm 4, mounted on ring flange 7a of movable wall 7, in combination, on the one hand, and a ring-seat projection 13d formed on the front end of main body 13b of sleeve 13, on the other hand; a longitudinal groove 18 formed in the said reduced end portion 13a; and further, an opening 19 formed horizontally through the enlarged, substantially cup-shaped rear end 5a of push rod 5 defining an inside chamber 103.

An elongated motion-transmitting rod 20 is linked at its rear end with a foot-operated brake pedal 23 of the automotive vehicle (not shown), as partially represented only schematically by a chain-dotted line 104. This rod 20 passes freely through the axial bore 26 formed through the main body 13b of sleeve 13 and snugly and slidably through the bore formed in the said reduced diameter end portion 13a of the same sleeve.

A stop snap ring 21 is mounted on the front end portion of rod 20. A sealing ring 22 is embedded in the material of rod 22 substantially at middle point of said reduced end portion 13a of sleeve 13.

A disc-like valving projection 20a is formed integrally and radially with and from the motion-transmitting rod 20 and in proximity to the front end of said main body 13b of sleeve 13, as shown in its closing position, wherein said valving projection cooperates with a valve seat member 25 made of a resilient material, preferably rubber.

At a certain distance from the said valving projection 20a, when viewed rightwards therefrom, there is a ring-like projection 20b made integral with the rod 20 and serving a spring seat for supporting the outer or rear end of a spiral spring 24, while the opposite and forward end of the latter spring abuts upon a mounting ring 24a which is kept in pressure engagement with a ring shoulder 13e formed on the inside wall surface of main body 13b of sleeve 13. The valve seat ring 25 is held on the said mounting ring 24a. The condition shown in FIG. 1 corresponds to the "off-service" one of the booster unit, as will become more clear as the description proceeds. Under such "off-service" position of the unit, atmospheric pressure prevailing in the bore 26 is positively interrupted from communication with the atmospheric pressure chamber 17 through a radial passage opening 27 formed through the hollow cylindrical material of the main body 13b of sleeve 13 and positioned in close proximity to the intermediate ring flange 13c, because of the closed position of the valve 20a; on seat 25.

The operation of the booster unit so far shown and described is as follows;

As was referred to hereinbefore, the shown position of the booster unit corresponds to "off-service" position thereof which means that the brake pedal 23 is freed from driver's foot pressure and thus the brake unit(s), not shown is(are) in its non-applied state.

Under these conditions, the movable wall member 7 is subjected to the relatively powerful action of return spring 8 and positioned thereby at a predetermined offset position towards the rear shell 3. At the same time, sleeve 13 is held at its rightwardly offset position shown, under the action of spring 16. In this case, the valve passage 102 is kept open, thus the vacuum chamber 9 is kept in fluid communication with the atmospheric pressure chamber, as was referred to hereinbefore.

Further, the bore space 26 communicating with ambient atmosphere, is interrupted from communication with the chamber 17 on account of the valve closure at 20a; 25 under the influence of spring pressure of the spring 24, as was referred to hereinbefore.

When the vehicle driver depresses brake pedal 23, the motion-transmitting rod 20 is caused to move leftwards and the stronger spring 24 is flexed into its a still further compressed state than the weaker spring 16, thereby the valve gap passage 102 is closed to prevent fluid communication between the chambers 9 and 17.

With further depression of brake pedal 23, the back surface of the valving disc flange 20a is brought into contact with a radial inside shoulder surface 105 defining the front end of the larger diameter part of the axial bore 26 and thus, a compression stroke of the spring 16 initiates over its initial compression.

At the same time, the valving disc flange 20a formed on the rod 20 begins to separate from contact its mating seat 25, thereby atmospheric air prevailing in the bore passing through the now-opened valve gap passage between the two parts 20a and 25, and further through radial opening 27 into the interior space of atmospheric pressure chamber 17. At this stage, fluid communication between the both chambers 17 and 9 has been interrupted in the manner as mentioned hereinabove.

On the other hand, the chamber 9 is kept in fluid communication through socket 10, duct 101 and check valve 11 fitted in the latter with the engine intake manifold 12, and thus, vacuum prevails in the chamber. Therefore, a significant pressure differential acts upon the diaphragm 4 which is caused, therefore, to shift leftwards. This leftward movement of the diaphragm is transmitted through movable wall member 7 to push rod 5 against the action of return spring 8.

By this diaphragm shift action, the master cylinder 6 will act a boosted-up braking action as conventionally.

When the driver's foot pressure is released from application on the brake pedal 23, motion-transmitting rod 20 is returned rightwards to its shown position under the action of spring 24, thereby the valving disc flange 20a being brought into tight contact with valve seat 25 for interrupting the fluid communication of atmospheric air from the bore 26 into the chamber 17, while the ring seat 13d on sleeve 13 recedes from contact with the bead ring 4b on diaphragm 4, so as to form the valve gap passage 102 again for the re-establishment of fluid communication between the both chambers 9 and 17. Therefore, the pressure differential acting upon the diaphragm 4 will disappear and the latter recovers its regular position shown, under the influence of return spring 8.

From the foregoing, it may be clearly understood that the valve means adapted for on-off control of the fluid communication between the atmospheric pressure chamber and the vacuum chamber are constituted by the inner bead ring formed on the diaphragm, on the one hand, and the mating valve seat formed on the front end of main body of the sleeve member, on the other, wherein the arrangement is such that the bead ring is caught at its operating position by the valve seat and for such purpose that even when the boosting operation of the booster unit is intentionally brought about and a substantial air pressure differential acts upon the diaphragm, a radial displacement of the latter can be positively and effectively prevented by the provisional, yet firm engagement of the beaded root end circle formed on the diaphragm with the mating ring-shaped valve seat formed on the movable sleeve member arranged concentrically to the motion-transmitting rod extending from the foot-operated brake pedal toward the push rod through the pneumatically operated diaphragm fitted in the housing of the booster unit.

Such diaphragm holding mechanism is of rather simplified design and the valve means thus provided may be of rough machining degree enough for attaining the desired function.

In addition and as a separate structure, second valve means are provided for on-off control of the fluid communication between the atmospheric pressure chamber and the vacuum chamber formed with in the housing of the booster unit, said valve means being constituted by a rigid valving portion on the said motion-transmitting rod, on the one hand, and a slidable valve seat member mounted on the bore wall of main body of a movable sleeve member arranged concentrically to the said motion-transmitting rod. This second valve means represents again a simple structural design with sufficiently effective function.

The brake booster unit according to this invention, representing above two different valve means of novel design shows according to our practical experience represents a rather simplified design and a smaller number constituent parts with superior effects over the comparative prior art design booster.

The embodiments of the invention in which an exclusive property or privilege is claimed are as follows:

1. A brake booster unit having a housing comprising a front and a rear shell element detachably coupled with each other and a diaphragm mounted in the interior space of said housing for mechanical separation thereof into a variable volume vacuum chamber and a variable volume atmospheric pressure chamber, biasing means disposed within said vacuum chamber for normally urging said diaphragm to the direction toward which the volume of said atmospheric-pressure chamber is reduced, a sleeve member and a motion-transmitting rod concentrically arranged thereto, partially introduced, sealingly and movably into the interior of said atmospheric-pressure chamber, said unit being characterized by first valve, means formed between said rod and said sleeve for on-off control of fluid communication between said atmospheric-pressure chamber and ambient atmospheric pressure, said first valve means being kept at its closed position when the booster unit is in its non-operating position, second valve means including beaded inner periphery portion of said diaphragm which acts as a valve seat and a valving portion formed on said sleeve and having a configuration for the prevention of radial displacement of said beaded periphery when the booster unit is maintained in its operating position and said second valve means is maintained at its closed position for interruption of fluid communication between said both chambers; and a backing member interposed between said biasing means and said diaphragm and slidable on an outer periphery of said sleeve for backing up said diaphragm.

2. The brake booster unit as set forth in claim 1, characterized by that said sleeve has an inner bore communicating with ambient atmosphere.

3. The brake booster unit as set forth in claim 1, characterized such that a valve portion of said first valve means includes a substantially radially extending, annular flange-like projection integral with said rod.

4. The brake booster unit as set forth in claim 3, characterized such that a valve seat member mating with said valve portion comprises a movable ring mounted on and displaceable along a stepped bore wall of said sleeve member.

5. The brake booster unit as set forth in claim 1, characterized by said valving portion of said second valve means adapted for cooperation with said beaded periphery of said diaphragm is a ring projection extending axially from the front end of a main body portion of said sleeve member.

* * * * *